Jan. 10, 1967 W. SARGENT 3,297,337
CAMERA CRAB DOLLY
Filed May 3, 1965 4 Sheets-Sheet 1
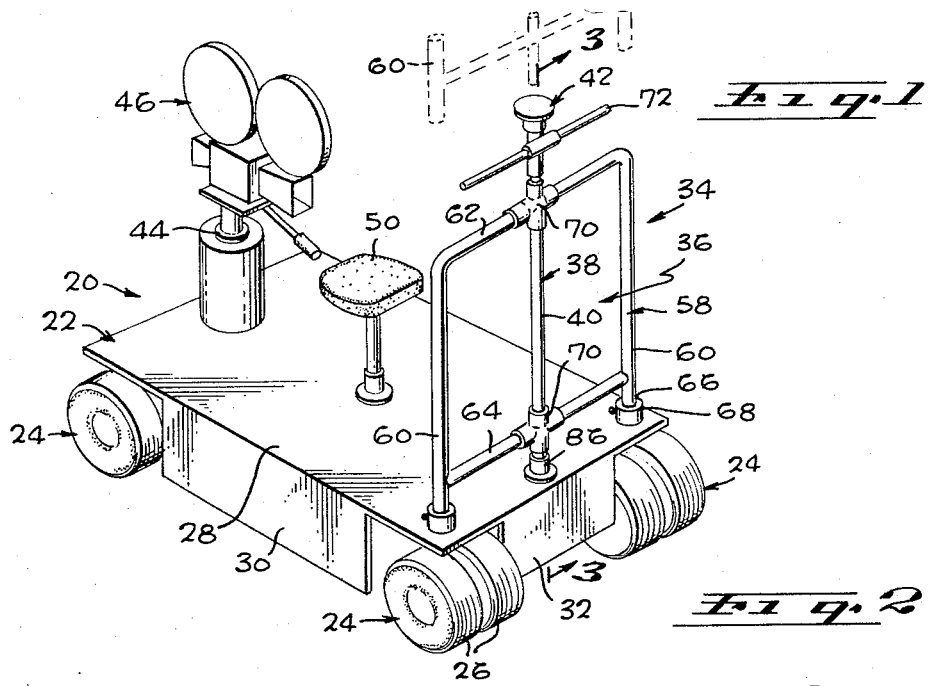
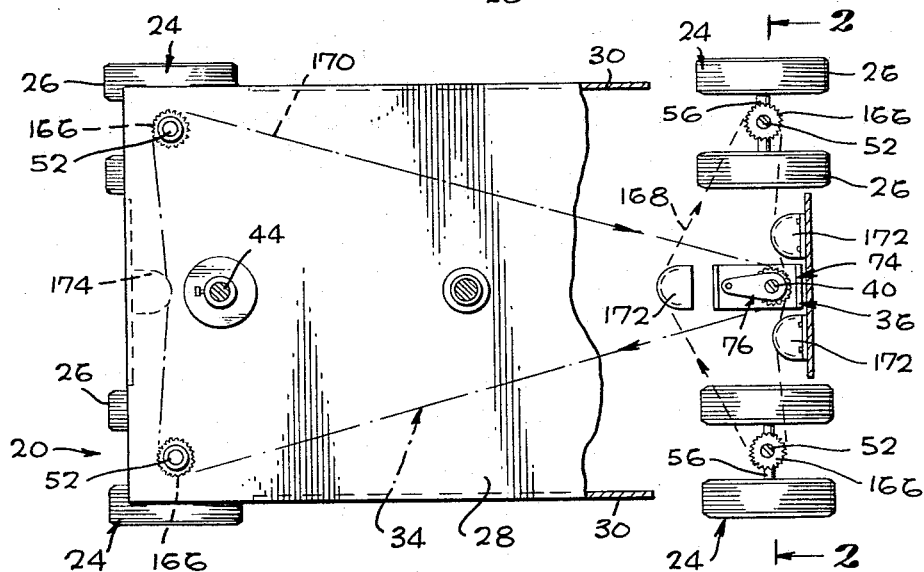
WILLIAM SARGENT
INVENTOR
BY
Beehler & Arant
ATTORNEYS

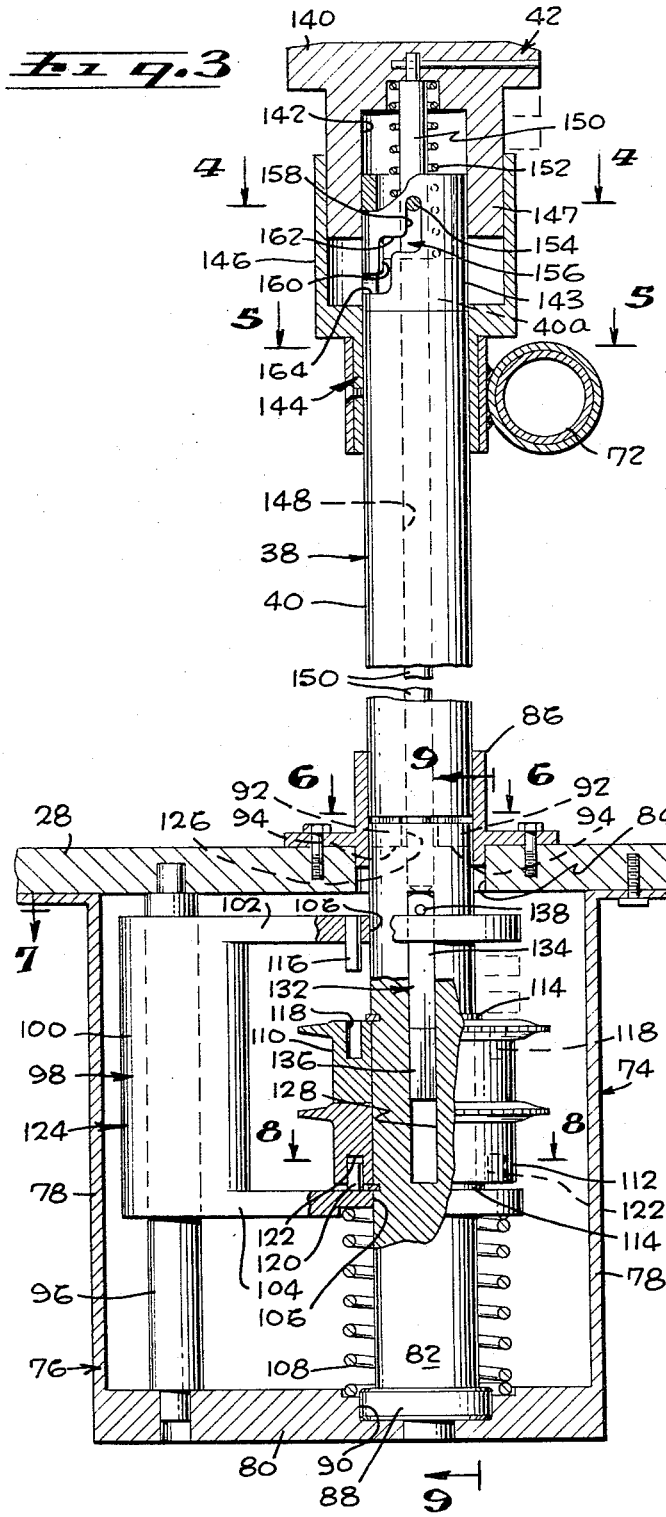

Jan. 10, 1967  W. SARGENT  3,297,337
CAMERA CRAB DOLLY
Filed May 3, 1965  4 Sheets-Sheet 3
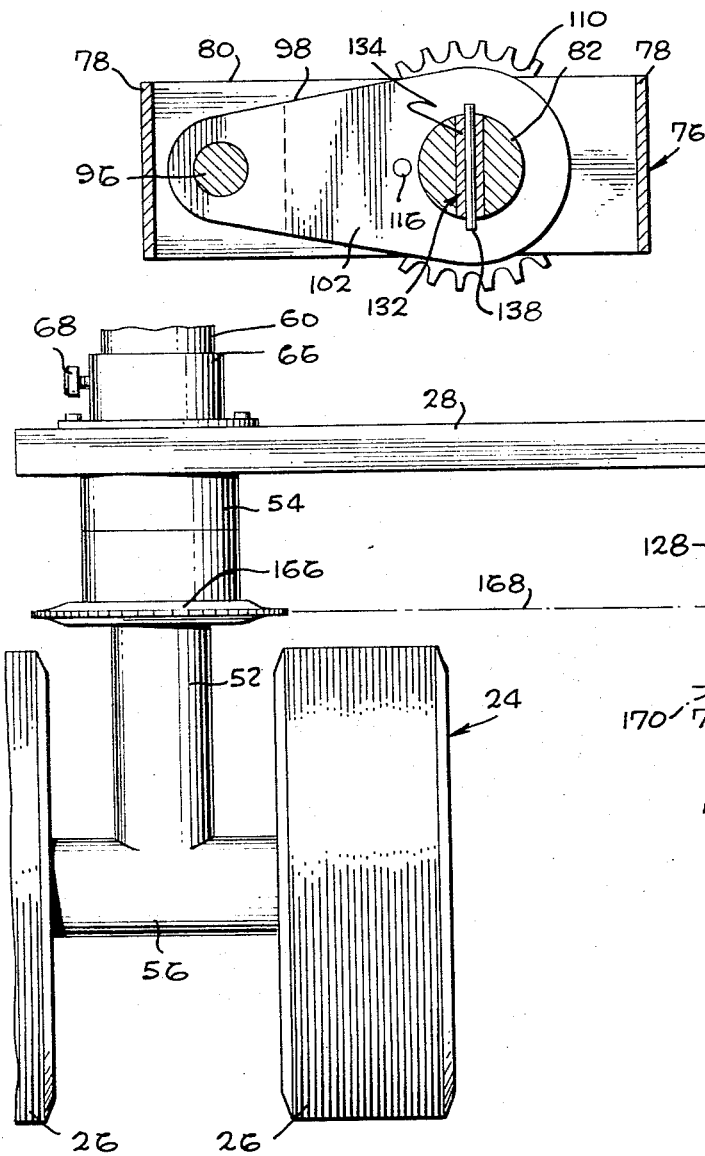
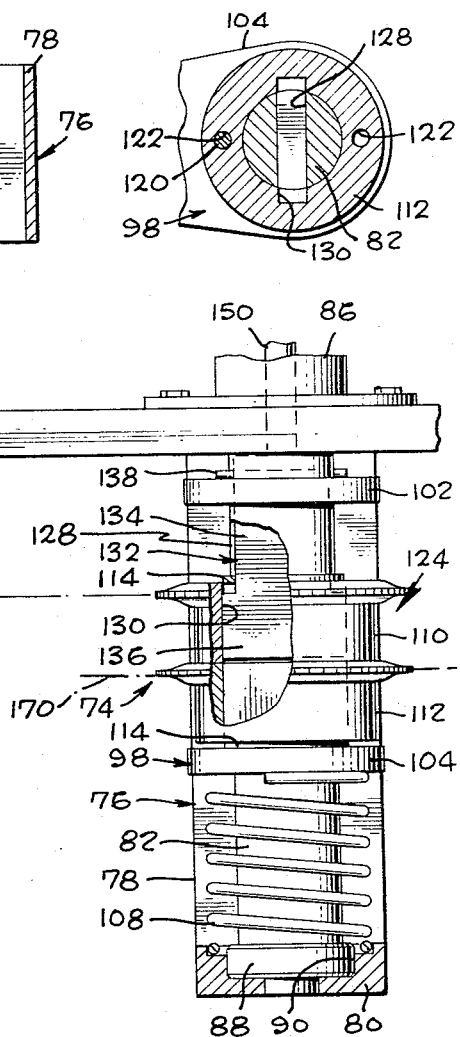
Fig. 7
Fig. 8
Fig. 9
WILLIAM SARGENT
INVENTOR
BY
Beehler & Arant
ATTORNEYS

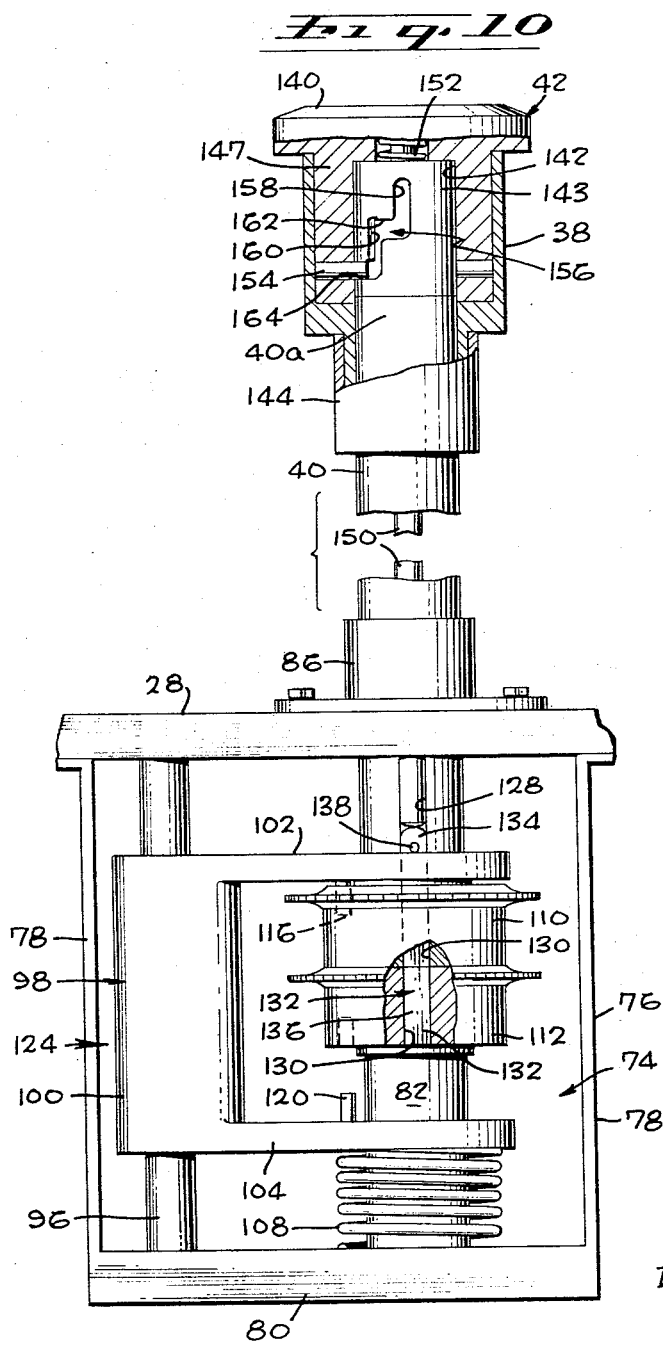
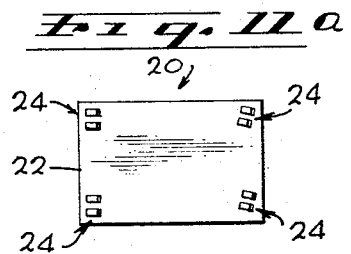
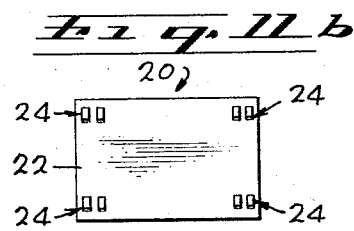
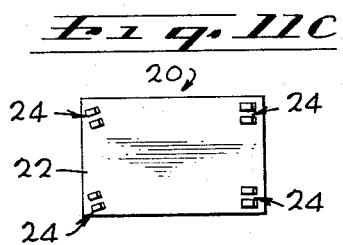

United States Patent Office 3,297,337
Patented Jan. 10, 1967

3,297,337
CAMERA CRAB DOLLY
William Sargent, Los Angeles, Calif., assignor, by direct and mesne assignments, to Colortran Industries, Inc., Burbank, Calif., a corporation of Delaware
Filed May 3, 1965, Ser. No. 452,758
15 Claims. (Cl. 280—91)

This invention relates generally to camera crab dollies and has more particular reference to a more versatile steering mechanism for camera crab dollies.

During the filming of motion pictures and television programs, it is often necessary to shift the positions of the cameras being used. In some cases, a camera may be moved while the filming is in progress. In other cases, the position of a camera may be shifted in the interval between the filming of two different scenes. Movement of a camera, particularly while in operation, must be smooth and capable of precise directional control, so as to permit travel of the camera from one point to another along an accurately predetermined path. To this end, motion picture and television cameras are generally mounted on mobile platforms which are referred to in the trade as camera dollies. When such dollies are highly directional they are called crab dollies.

A typical crab dolly of the type to which this invention pertains, comprises a supporting base mounted on caster wheels and equipped with a steering mechanism for the dolly wheels and a support for a camera. The steering mechanism includes a rear steering assembly having a steering handle and a steering mode selector which may be pre-set to operatively connect the steering handle to selected wheels of the dolly in such manner as to permit different modes of steering control. Two of these modes of steering control are commonly referred to in the trade as tracking, and crabbing. The improved steering mechanism of this invention provides a third mode of steering control, hereinafter referred to simply as "steering" which has not heretofore been incorporated into crab dollies, the camera support is located adjacent the forward end of the dolly and may comprise either a rigid mount for supporting a camera at a fixed elevation or a hoist which can be raised and lowered hydraulically to vary the camera elevation. Mechanical and electrical lifts are also common.

Two conventional modes of steering control referred to above are well-known in the art and, accordingly, will be described herein only in sufficient detail to enable a full and complete understanding of the invention. The first mode of steering control, known as tracking, is accomplished by locking the front wheels of a camera dolly in fixed angular positions, wherein their axes are normal to the fore and aft center line of the dolly, and simultaneously steering the rear wheels of the dolly in such manner that the rear wheel axes remain approximately parallel to one another. The second mode of steering control, crabbing, is accomplished by simultaneously steering all of the dolly wheels in such a way that the wheel axes remain approximately parallel to one another. In this new design, a third and newly added mode of steering control, simply called "steering," is accomplished by locking the rear wheels of the dolly in fixed angular positions, wherein their axes are normal to the fore and aft center line of the dolly, and simultaneously steering the front wheels of the dolly in such manner that the front wheel axes remain substantially parallel to one another.

The advantages of the tracking and crabbing modes of steering control are well recognized and, accordingly, will not be discussed in detail. Even the newly introduced "steering" is basic enough to understand. Suffice it to say that the tracking and steering modes permit selective linear and arcuate movement of a camera dolly in a way which is particularly suited to certain motion picture and television filming operations. The crabbing mode, on the other hand, permits selective fore and aft as well as lateral linear movement of a camera dolly in a way which is particularly suited to other motion picture and television filming operations. It is this crabbing facility that gives the dollies the name "crab dolly."

One important aspect of this invention is concerned with an improved steering mechanism for crab dollies, which steering mechanism is characterized by its relative simplicity and low cost to manufacture, and which is uniquely constructed to enable shifting and presetting of steering control between the three different modes referred to above, with greater ease, speed, and reliability than is possible with the existing camera crab dolly steering mechanisms, and their conventional two modes of steering.

A specific and important object of the invention, therefore, is to provide a crab dolly having an improved steering mechanism which utilizes the three modes of steering control, to wit, tracking, crabbing, and now steering, and permits shifting from one steering mode to another with maximum ease, speed, and reliability.

Another important object of the invention is to provide an improved camera dolly wherein the camera support and steering assembly of the steering mechanism may be quickly and easily removed from the supporting base of the dolly for convenience of transportation of the dolly from one location to another, in its own, especially built, trunk.

A further object of the invention is to provide an improved camera dolly which is relatively simple in construction economical to manufacture, simple to operate, and otherwise ideally suited for lightweight operation and portability.

With these and other objects in view, the invention consists in the construction, arrangement, and combination of the various parts of the invention whereby the objects contemplated are attained as hereinafter set forth, pointed out in the appended claims and illustrated in the accompanying drawings:

In these drawings:

FIGURE 1 is a perspective view of a camera dolly constructed in accordance with this invention;

FIGURE 2 is a slightly enlarged top plan view of the camera dolly with parts removed and broken away for the sake of clarity;

FIGURE 3 is an enlarged vertical section taken on line 3—3 of FIGURE 1;

FIGURE 4 is a section taken on line 4—4 in FIGURE 3;

FIGURE 5 is a section taken on line 5—5 in FIGURE 3;

FIGURE 6 is a section taken on line 6—6 in FIGURE 3;

FIGURE 7 is a section taken on line 7—7 in FIGURE 3;

FIGURE 8 is a section taken on line 8—8 in FIGURE 3;

FIGURE 9 is a section taken on line 9—9 in FIGURE 3;

FIGURE 10 is a view similar to FIGURE 3 showing the parts in an alternative position;

FIGURE 11a is a plan view on reduced scale, of the underside of the camera dolly showing the dolly wheels set for the mode of steering control known as cracking;

FIGURE 11b is a view similar to FIGURE 11a showing the wheels set for the mode of steering control known as crabbing;

FIGURE 11c is a view similar to FIGURE 11a showing the wheels set for the mode of steering control known as steering;

The camera dolly 20 illustrated in these drawings comprises a generally rectangular supporting base 22 having four sets 24 of caster wheels 26 at the four corners, respectively, of the base. Supporting base 22 includes an upper horizontal deck, or platform, 28 having depending walls or flanges 30 along its side and end edges, respectively. The adjacent ends of these flanges are spaced as shown best in FIGURE 1, to accommodate the wheel sets 24. The camera dolly is equipped with a steering mechanism 34, including a steering assembly 36 at the rear of the dolly platform 28. Included in this steering assembly is a steering handle 38 having a vertical steering post 40. Mounted on the upper end of this post is a steering mode selector 42. As will be explained later, the steering mode selector is presettable to any one of three different positions to condition the steering mechanism 34 for the three different modes of steering control referred to earlier, to wit, tracking, crabbing, and steering positions, respectively. Mounted on the forward end of the dolly platform 28 is an adjustable support 44 for a camera 46. A seat 50 for a camera operator is mounted on the platform between the camera support and the steering assembly.

As shown best in FIGURE 9, each of the wheel sets 24 comprises a vertical axle 52, the upper end of which is rotatably and axially supported in a bearing 54 secured to the underside of the dolly platform 28. The axle 52 is thus free to turn on its central vertical axis but is restrained against axial movement relative to the platform. Rigid on the lower end of each vertical axle 52 is a horizontal axle 56. The horizontal axle extends normal to and beyond opposite sides of the vertical axle. The two wheels 26 of each wheel set 24 are rotatably supported on opposite ends of the respective horizontal axle, as shown.

The rear steeering assembly 36 of the steering mechanism 34 comprises, in addition to the steering handle 38, a supporting frame 58 for the post 40 of the handle. This supporting frame includes a pair of upright frame members 60 which are rigidly joined at their upper ends and adjacent their lower ends by cross members 62 and 64, respectively. The lower extremities of the frame members 60 extend a short distance below the lower cross member 64 and are removably fitted in sockets 66 rigidly secured to the upper surface of the dolly platform 28. These sockets are equipped with set screws 66 having knurled knobs for releasably securing the frame member 60 in the sockets. The cross members 62 and 64 of the handle supporting frame 53 include central coaxial bearings 70 which rotatably and axially support the post 40 of the steering handle 38. Centrally secured to the upper end of the steering post 40 is a horizontal steering bar 72.

Mounted on the underside of the dolly platform 28, directly below the steering handle 38, is a transmission assembly 74. This transmissioin comprises a generally U-shaped bracket 76 including vertical legs 78 rigidly joined at their lower extremities by a horizontal cross member 80. The upper extremities of the bracket legs 78 are bolted to the underside of the dolly platform 28. Extending between the platform and the lower cross member 80 of the bracket 76, in coaxial alignment with the steering post 40, is a sprocket shaft 82. The upper end of this sprocket shaft extends through an opening 84 in the dolly platform 28 and it is rotatably and axially supported in a flanged bearing sleeve 86 secured to the upper surface of the platform. The lower end of the sprocket shaft 82 is rotatably and axially supported in a bearing 88 positioned within a recess 90 in the lower cross member 80 of the transmission bracket 76.

The bearing sleeve 86 removably receives and journals the lower extremity of the steering post 40. Extending axially from the lower end of the steering post are keys 92 which engage in axial slots 94 in the upper end of the sprocket shaft 82. The steering post 40 and sprocket shaft 82 are, thereby, releasably interconnected for rotation of the sprocket shaft by the steering post.

Extending between and fitted at its ends in the dolly platform 28 and the lower cross member 80 of the transmission bracket 76 is a shaft 96. This shaft is disposed in spaced parallel relation to the sprocket shaft 82. Slidably supported on the shaft 96 is a clutch yoke 98. This yoke includes a bearing 100 which is axially bored to slidably fit on the shaft 96 and transverse arms 106 and 104 which extend horizontally from the upper and lower ends, respectively, of the bearing. The free ends of these yoke arms have coaxial bores 106 slidably receiving the sprocket shaft 82. Encircling the sprocket shaft 82 between the lower cross member 80 of the transmission bracket 76 and the lower yoke arm 104 is a compression spring 108 which urges the clutch yoke 98 upwardly along the shafts 82 and 96.

Rotatably mounted on the sprocket shaft 82, intermediate its ends and between the upper and lower arms 102, 104 of the clutch yoke 98, are a pair of drive sprockets 110 and 112. These sprockets are located in close proximity to one another and are restrained against axial movement along the sprocket shaft by snap rings 114 fitted in grooves in the sprocket shaft. The clutch yoke 98 is movable between an upper position shown in FIGURE 3 and a lower position shown in FIGURE 10, and through an intermediate position (not shown) between said upper and lower positions. When the yoke occupies its upper position of FIGURE 3, the lower yoke 104 is located in close proximity to the lower sprocket 112. In the lower position of the yoke, the upper yoke arm 102 is located in close proximity to the upper sprocket 110. The sprockets are centered between the yoke arms when the yoke occupies its intermediate position.

Extending from the underside of the upper yoke arm 102 is a clutch pin 116 which is selectively engageable in a pair of diametrically opposed sockets 118 in the upper sprocket 110, to lock the latter sprocket against rotation, by movement of the clutch yoke 98 to its lower position of FIGURE 10. Extending from the upper side of the lower yoke arm 104 is a clutch pin 120 which is selectively engageable in a pair of diametrically opposed sockets 122 in the lower sprocket 112 to lock the latter sprocket against rotation, by movement of the clutch yoke to its upper position of FIGURE 3. Movement of the yoke to its lower position retracts the lower clutch pin 120 out of engagement with the lower sprocket 112, thereby to release the latter for rotation. Similarly, movement of the yoke to its upper position retracts the upper clutch pin 116 out of engagement with the upper sprocket 110, thereby to release the latter sprocket for rotation. When the clutch yoke occupies its intermediate position, both clutch pins 116 and 120 are disengaged from their respective sprockets thereby to release both sprockets for rotation. It is apparent at this point, therefore, that the clutch yoke 98, its clutch pins 116, 120, and the pin receiving sockets 118 and 122 in the sprockets 110, 112, together form a clutch mechanism for selectively locking either sprocket 110 or 112 against rotation and releasing the other sprocket for rotation, or releasing both sprockets for simultaneous rotation. In the drawings, this clutch mechanism, is designated in its entirety by the reference numeral 124.

Sprocket shaft 82 has an axial bore 126 which opens at its upper end to the sprocket shaft. The lower end of this bore opens into a slot 128 extending through the sprocket shaft 82 in plane containing the shaft axis. Sprockets 110, and 112 have internal slots or keyways 130. These keyways may be aligned with the sprocket shaft slot 128 by rotation of the sprockets to predetermined angular positions relative to the sprocket shaft.

Slidably fitted in the slot 128 in the sprocket shaft 82 is a flat clutch key 132. This clutch key includes an upper shank 134 and a lower cross bar 136. The key shank 134 has a width approximately equal to or slightly less than the diameter of the sprocket shaft and extends to the bore 106 in the upper arm 102 of the clutch yoke 98. The cross bar 136 of the clutch key has a length greater than the diameter of and projects radially beyond opposite sides of the sprocket shaft. Extending through the key shank 134 above and over the upper yoke arm 102 is a pin 138.

As will appear shortly, the clutch yoke 98 and the clutch key 132 are movable as a unit axially of the sprocket shaft 82. With this in mind, assume for the moment, that the sprockets 110 and 112 are rotated to align their keyways 130 with the sprocket shaft slot 128. Under these conditions, when the yoke and key occupy their upper positions of FIGURE 3, the cross arm 136 of the key engages in the keyways 130 of the upper sprocket 110 and thereby locks the latter sprocket to the sprocket shaft. When the clutch yoke and key are shifted to their lower positions of FIGURE 10, the clutch key cross bar 136 engages in the keyways 130 of the lower sprocket 112 to lock the latter sprocket to the sprocket shaft. Shifting of the yoke and key to their intermediate positions engages the cross arm of the key in the keyways of both sprockets so that both sprockets are simultaneously locked to the sprocket shaft. The clutching means 130, 132 just described forms part of the clutch mechanism 124.

It is now apparent that the clutch mechanism 124 is effective to selectively lock either of the sprockets 110 and 112 against rotation and to lock the other sprocket to the sprocket shaft 82 for rotation with the latter shaft, as well as to simultaneously lock both sprockets to the sprocket shaft for rotation with the shaft. Thus, shifting of the clutch yoke 98 and clutch key 132 to their upper positions of FIGURE 3 locks the lower sprocket 112 against rotation and locks the upper sprocket 110 to the sprocket shaft 82 for rotation with the shaft. Shifting of the clutch yoke and key to their lower positions of FIGURE 10 locks the upper sprocket 110 against rotation and locks the lower sprocket 112 to the sprocket shaft for rotation with the shaft. Shifting of the clutch yoke to its intermediate position simultaneously locks both sprockets to the sprocket shaft for rotation in unison with the shaft. For reasons which will appear presently, the upper intermediate, and lower positions of the clutch yoke and clutch key are hereinafter referred to as their tracking, crabbing, and steering positions, respectively. As will be explained shortly, clutch mechanism 124 is effective to condition the steering mechanism 34 of the present camera dolly for each of its three modes of steering control.

The steering mode selector 42, in turn, is effective to set the clutch mechanism 124 for each of these three steering modes. To this end, the mode selector comprises an upper knob 140 having a cylindrical bore 142 slidably and rotatably receiving a sleeve 143 of the same external diameter as and coaxially secured to a reduced extension 40a on the upper end of the steering post 40. Fixed to the steering post is a tubular shield 144 having an upper cylindrical wall 146 which surrounds the lower cylindrical wall 147 of the selector knob 140. The steering post has an axial bore 148 slidably and rotatably receiving a rod 150. The upper end of this rod is secured to the selector knob 140. The lower end of rod 150 extends below the lower end of the steering post into the upper end of the bore 126 in the sprocket shaft 82 and abuts the upper end of the clutch key 132. Surrounding the upper end of the rod 150 is a compression spring 152. Spring 152 acts between the selector knob 140 and upper end of the steering post extension 40a and urges the selector knob and rod upwardly in the steering post. Secured to the lower end 147 of the selector knob, and projecting radially therefrom into the selector knob bore 142, is a pin 154. Pin 154 engages in a slot 156 in the upper steering post sleeve 143 to create a cam action.

Slot 156 has two vertical sections 158 and 160 which extend axially of the steering post 40 and are off-set axially and circumferentially of the post. The adjacent ends of these vertical slot sections are joined by a horizontal slot section 162 extending circumferentially of the post. A lower horizontal section 164 of the slot 156 extends circumferentially of the steering post from the lower end of the lower vertical slot section 160. It is apparent that the steering mode selector 42 may be locked, in effect, in any one of three positions, to wit, the upper position shown in FIGURE 3, wherein the pin 154 is located in and seats against the upper end of the upper slot section 58, the lower postion shown in FIGURE 10, wherein the pin is located in and seats against the upper wall of the lower horizontal slot section 164, and an intermediate position (now shown) wherein the pin is located in and seats against the upper end of the lower vertical slot 160. It is also evident that the selector 42 is yieldably retained in each of these positions by the transmission spring 108 and the selector spring 152. For reasons to appear presently, the upper intermediate, and lower positions of the steering mode selector 42 are hereafter referred to as its tracking, crabbing, and steering positions, respectively. It is significant to note at this point that the steering mode selector is moved from its upper tracking position of FIGURE 3 to its intermediate crabbing position and its lower steering position of FIGURE 10, by depressing the knob downwardly against the action of the transmission spring 108 and the selector spring 152 and then rotating the knob to cause the selector pin 154 to enter the horizontal slot sections 162 and 164, as the case may be. On the other hand, return of the steering mode selector 42 from its lower steering position to either its intermediate crabbing position or its upper tracking position is accomplished by simply rotating the knob in the opposite direction and allowing the springs 108 and 152 to drive the selector upwardly.

As just noted, the lower end of the steering mode selector knob 150 abuts the upper end of the clutch key 132. Accordingly, it is apparent that vertical movement of the steering mode selector 42 effects corresponding vertical movement of the clutch yoke 98 and the clutch key. The selector rod is so axially dimensioned that movement of the selector to any one of its three positions effects movement of the clutch yoke and key to the corresponding position. In other words, when the mode selector occupies its upper tracking position of FIGURE 3, the clutch yoke and clutch key occupy their upper tracking positions of that figure. Similarly, movement of the mode selector to its lower steering position of FIGURE 10 effects movement of the clutch yoke and key to their lower steering positions of the latter figure. Movement of the mode selector to its intermediate crabbing position effects movement of the yoke and key to their intermediate crabbing positions.

Keyed on the vertical axle 52 of each wheel set 24 is a driven sprocket 166. A first sprocket chain 168 is trained about the upper transmission sprocket 110 and the sprockets 166 on the two rear wheel sets 24. A second sprocket chain 170 is trained about the lower transmission sprocket 112 and the sprockets 166 on the two front wheel sets 24. Thus, rotation of the upper transmission sprocket is effective to simultaneously rotate the two rear wheel sets and rotation of the lower transmission sprocket is effective to simultaneously rotate the two front wheel sets. Mounted on the transmission bracket 76 and the rear dolly flange 32, respectively, are take-up guides 172 which engage the sprocket chain 168 to maintain the latter under proper tension. A similar cable guide 174 mounted on the front dolly flange 32 engages the sprocket chain 170 to retain the latter under proper tension.

The wheel sets 24 and the transmission sprockets 110, 112 are initially aligned in such manner that the axes of all of the wheel sets are parallel to one another when the keyways 130 in the sprockets are aligned with the slot 128 in the sprocket shaft 82. In addition, the clutch pin receiving socket 118 in the upper transmission sprocket 110 are oriented relative to the keyway in the latter sprocket in such manner that each socket 118 is aligned with its associated clutch pin 116 when the axes of the rear wheel sets 24 are normal to the longitudinal center line of the camera dolly. Similarly, the clutch pin receiving sockets 122 in the lower transmission sprocket 112 are oriented relative to the keyway in the latter sprocket in such manner that each socket 122 is aligned with its associated clutch pin 120 when the axes of the front wheel sets 124 are normal to the longitudinal center line of the dolly.

At this point, attention is directed to a significant feature of the invention. This feature resides in the fact that the clutch pins 116, 122 and the cross bar 136 of the clutch key 132 are so dimensioned that when the clutch yoke 98 and the clutch key are moved from their intermediate crabbing positions to their lower steering positions, the upper clutch pin 116 enters the currently aligned socket 118 in the upper transmission sprocket 110 simultaneously with engagement of the clutch key across bar 136 from the upper sprocket. Similarly, when the clutch yoke and clutch key are moved from their intermediate crabbing positions to their upper tracking positions, the lower clutch pin 120 enters the currently aligned socket 122 in the lower transmission sprocket 112 simultaneously with disengagement of the clutch key cross bar from the latter sprocket.

The operation of the illustrated camera crab dolly will now be described. Assume first that the steering mode selector 42 is set in its intermediate crabbing position, wherein the selector pin 154 engages in the upper horizontal section 162 of the pin slot 156. In this position of the steering mode selector, the clutch yoke 98 and clutch key 132 occupy their intermediate crabbing positions, wherein the clutch pins 116, 122, are disengaged from both of the transmission sprockets 110 and 112 and the clutch key cross bar 136 engages in the keyways 130 of both sprockets to lock the latter to the sprocket shaft 82 for rotation in unison therewith. Under these conditions, rotation of the steering handle 38 is effective to rotate all of the wheel sets 24 in unison and in such manner that the axes of all of the wheel sets remain parallel to one another. This mode of steering control is referred to in the trade as crabbing and permits translational movement of the camera dolly in any direction without changing the heading of the dolly. Assume next, that the steering mode selector 42 is moved to its upper tracking position of FIGURE 3, wherein the selector pin 154 is located in the upper vertical section 158 of the pin slot 156. In this position of the selector, the clutch yoke 98 and the clutch key 132 occupy their upper tracking positions of the latter figure wherein the lower clutch pin 120 engages the lower sprocket 112 to lock the latter sprocket against rotation and the clutch key cross bar 136 engages in the keyway 130 of the upper sprocket 110, to lock the latter sprocket to the sprocket shaft 82 for rotation in unison therewith. The front wheel sets 24 of the camera dolly are now locked in neutral positions, wherein the axes of these wheel sets are normal to the longitudinal center line of the dolly, and the rear wheel sets are operatively connected to the steering handle 38, whereby rotation of the handle is effective to rotate the rear wheel sets in unison in such manner that the axes of the latter wheel sets remain parallel to one another. This mode of steering control is referred to in the trade as tracking and permits fore and aft linear movement of the dolly as well as fore and aft arcuate movement of the dolly in such manner that the rear end of the dolly in effect swings relative to its forward end. Assume finally that the steering mode selector 42 is moved to its lower steering position of FIGURE 10, wherein the selector pin 154 engages in the lower horizontal section 164 of the pin slot 156. In this position of the mode selector, the clutch yoke 98 and the clutch key 132 occupy their lower steering positions of the latter figure, wherein the upper clutch pin 16 engages the upper transmission sprocket 110 to lock the latter against rotation and the clutch key cross bar 136 engages in the keyway 130 of the lower sprocket 112 to lock the latter sprocket to the sprocket shaft 82 for rotation in unison therewith. Under these conditions, the rear wheel sets are locked in their neutral positions, wherein the axes of these wheel sets are normal to the longitudinal center line of the camera dolly, and the front wheel sets are operatively connected to the steering handle 38, whereby rotation of the handle is effective to rotate the forward wheel sets in unison in such manner that the axes of the latter wheel sets remain parallel to one another. This latter mode of steering control will be referred to in the trade simply as steering and permits fore and aft linear movement of the dolly in such manner that the forward end of the dolly in effect swings relative to its rear end.

It is apparent from the earlier description of the transmission 74 that when shifting from one mode of steering control to another, the steering handle must be rotated to its neutral position, wherein all of the wheel sets 24 of the camera dolly occupy their neutral positions, the wheel axes are all normal to the longitudinal center line of the camera dolly and one each of the clutch pin receiving sockets 118, 122 in the transmission sprockets 110, 112 are aligned with the clutch pins 116, 120 thereby to permit the clutch pins to enter the sockets. This requirement of rotation of the steering handle to its neutral position prior to shifting from one mode of steering control to another assures proper relative orientation of the several wheel sets 24 for crabbing, proper fixed orientation of the front wheel sets for tracking, and proper fixed orientation of the rear wheel sets for steering. It will be recalled that when shifting from the crabbing mode of steering control to either the tracking mode or the steering mode, each of the transmission sprockets 110 and 112 is locked at all times to either the sprocket shaft 82 or the clutch yoke 98. This prevents relative rotation of the sprockets during shifting of steering control, except as occasioned by rotation of the steering handle 38, and thereby facilitates shifting from one mode of steering to the other.

As noted earlier, another important feature of the invention resides in the unique arrangement of the rear steering assembly 36 and the forward camera support 44, whereby the steering assembly and the camera support may be removed for convenience of transportation of the camera dolly from one location to another. In this connection, it will be recalled that the lower extremities of the side member 60 of the steering post supporting frame 58 are releasably locked, by the set screws 68, in the sockets 66. It will also be recalled that the lower extremity of the steering post 40 is removably fitted in the bearing sleeve 86 and is releasably coupled to the upper end of the sprocket shaft 82. Accordingly, the entire steering assembly 36 may be removed from the supporting base 22 of the camera dolly by loosening the set screws 68 and lifting the assembly from the base. The lower end of the camera support 44 is similarly removably fitted in a socket 176 in the platform 28 of the camera dolly, whereby the camera support may also be removed from the supporting base of the dolly. The camera support may be releasably secured in the socket 176 in any convenient way. In the drawings, the camera support 44 has been illustrated as comprising a central tubular post which locates the camera 46 at a fixed elevation. If desired, however, the camera support may comprise a hydraulic hoist of suitable design for raising and lowering the camera.

While the invention has herein been shown and described in what is conceived to be its most practical and preferred embodiment, it is recognized that departures may be made therefrom within the scope of the invention which is not to be limited to the details disclosed herein, Having described the invention, what is claimed as new in support of Letters Patent is:

1. A camera dolly comprising: a supporting base including a pair of front caster wheels and a pair of rear caster wheels, each said wheel having a generally vertical swivel axis and a generally horizontal rotation axis and being rotatable on its swivel axis to a neutral position wherein the rotation axis of the respective wheel is approximately normal to the longitudinal center line of the dolly, a steering handle rotatably supported on said base, and transmission means mounted on said base and operatively connected between said wheels and said steering handle for selectively locking either wheel pair in their neutral positions while driveably coupling the other wheel pair to said handle for rotation of said other wheel pair in unison on their respective swivel axes in such manner that the rotation axes of said other wheel pair remain approximately parallel, and driveably coupling both said wheel pairs to said steering handle for rotation of both wheel pairs in unison on their respective swivel axes in such manner that the rotation axes of both wheel pairs remain approximately parallel.

2. A camera dolly according to claim 1 wherein: said transmission means comprises shiftable clutch means for selectively locking said wheels to said base and driveably coupling said wheels to said handle, said clutch means being movable between a first position, wherein said front wheels are locked to said base in their neutral positions and said rear wheels are driveably coupled to said handle, and a second position, wherein said rear wheels are locked to said base in their neutral positions and said front wheels are driveably coupled to said handle, and through an intermediate position, wherein both said front wheels and rear wheels are driveably coupled to said handle, and a steering mode selector proximate to said handle for shifting said clutch means between said positions thereof.

3. A camera dolly according to claim 1 wherein: said transmission means is mounted on the underside of said base directly below said handle and comprises shiftable clutch means for selectively locking said wheels to said base and driveably coupling said wheels to said handle, said clutch means being movable between a first position, wherein said front wheels are locked to said base in their neutral positions and said rear wheels are driveably coupled to said handle, and a second position, wherein said rear wheels are locked to said base in their neutral positions and said front wheels are driveably coupled to said handle, and through an intermediate position wherein said front and rear wheels are driveably coupled to said handle, and a steering mode selector mounted on said handle and operatively connected to said clutch means for shifting said clutch means between said positions thereof.

4. A camera dolly according to claim 3 wherein: said steering mode selector comprises a selector knob on the upper end of said handle and a rod extending through said handle from said knob to said clutch means for operably connecting said knob to said clutch means.

5. A camera dolly comprising: a supporting base, including a pair of front caster wheels and a pair of rear caster wheels, each said wheel having a generally vertical swivel axis and a generally horizontal rotation axis and being rotatable on its swivel axis to a neutral position wherein the rotation axis of the respective wheel is approximately normal to the longitudinal center line of the dolly, a steering handle rotatably supported on said base, and transmission means mounted on said base and operably connected between said wheels and said steering handle, said transmission means comprising a rotary shaft connected to said handle for rotation by said handle, first and second drive sprockets rotatable on said shaft, a first driven sprocket rigid on each rear wheel concentric with its swivel axis, a second driven sprocket rigid on each front wheel concentric with its swivel axis, a first endless force transmission member trained about said first sprockets whereby the rotation of said first drive sprocket is effective to rotate said rear wheels in unison on their respective swivel axes, a second endless force transmission member trained about said second sprockets, whereby rotation of said second drive sprocket is effective to rotate said front wheels in unison on their respective swivel axes, said rotation of axes of said rear wheels being approximately parallel and said rotation axes of said front wheels being approximately parallel, said driving sprockets being disposed in first given angular positions relative to said base and second relative angular positions relative to one another when said wheels occupy said neutral positions, a clutch mechanism for selectively locking either drive sprocket to said base in said first relative angular position with respect to said base while locking the other drive sprocket to said shaft for rotation therewith, and locking both said drive sprockets to said shaft in said second relative angular positions with respect to one another for rotation of said drive sprockets in unison with said shaft, and a steering mode selector accessible from a position adjacent said steering handle for operating said clutch mechanism.

6. A camera dolly according to claim 5 wherein: said clutch mechanism comprises first and second clutch members mounted on said base and shaft respectively, for movement along direction lines parallel to said shaft between first and second positions and through intermediate positions, first co-acting clutch means on said first clutch member and first drive sprocket which engage to lock said first drive sprocket to said base in said first relative angular position with respect to said base when said clutch members occupy said first positions, second co-acting clutch means on said first clutch member and second drive sprocket which engage to lock said second drive sprocket to said base in said first relative angular position with respect to said base when said clutch members occupy said second positions, third co-acting clutch means on said second clutch member and second drive sprocket which engage to lock said second drive sprocket to said shaft for rotation therewith when said clutch members occupy said first positions, fourth co-acting clutch means on said second clutch member and first drive sprocket which engage to lock said first drive sprocket to said shaft for rotation therewith when said clutch members occupy said second positions, said first and second clutch means being disengaged and said third and fourth clutch means being engaged to lock both said drive sprockets to said shaft in said second relative angular positions with respect to one another and for rotation in unison with said shaft when said clutch members occupy said intermediate positions, and said steering mode selector being operably connected to said clutch members for shifting said clutch members between said positions thereof.

7. A camera dolly according to claim 5 wherein: said clutch mechanism comprises a clutch member mounted on said base for movement along a direction line parallel to said shaft between first and second positions and through an intermediate position, first co-acting clutch means on said clutch member and first drive sprocket which engage to lock said first drive sprocket to said base in said first relative angular position with respect to said base when said clutch member occupies said first position, second co-acting clutch means on said clutch member and second drive sprocket which engage to lock said second drive sprocket to said base in said first relative angular position with respect to said base when said clutch member occupies said second position, said first and second clutch means being disengaged when said clutch member occupies said intermediate position thereof, said shaft having a slot extending axially through said drive sprockets and said drive sprockets having internal keyways alignable with said slot, a clutch key slidably positioned in said slot and extending radially beyond said shaft for engagement in said sprocket keyways, said clutch key being movable between a first position, wherein said key engages in said keyway in said second drive sprocket to lock said first and second drive sprocket to said shaft for rotation therewith, and a second position wherein said key engages in said keyway in said first drive sprocket to lock said first drive sprocket to said shaft for rotation therewith, and through an intermediate position, wherein said key engages in said keyways in both drive sprockets to lock both drive sprockets to said shaft in said second relative angular positions with respect to one another for rotation of said drive sprockets in unison with said shaft, means operatively connecting said clutch member and clutch key for movement in unison to said position thereof, and said steering mode selector being operatively connected to said clutch member and clutch key for moving said clutch member and clutch key in unison to said positions thereof.

8. A camera dolly according to claim 5 wherein: said clutch mechanism comprises a clutch yoke mounted on said base for movement along a direction line parallel to said shaft between first and second positions and through an intermediate position, said yoke including arms straddling said drive sprockets, first co-acting clutch means on one of said yoke arms and said first drive sprocket which engage to lock said first drive sprocket to said base in said first relative angular position with repsect to said base when said yoke occupies said first position, second co-acting clutch means on the other yoke arm and said second drive sprocket which engage to lock said second drive sprocket to said base in said first relative angular position with respect to said base when said clutch yoke occupies said second position, said first and second clutch means being disengaged when said clutch yoke occupies said intermediate position thereof, said shaft having a slot extending axially through an opening radially toward said drive sprockets and said drive sprockets having internal keyways alignable with said slot, a clutch key slidably positioned in said slot and extending radially beyond said shaft for engagement in said keyways, said clutch key being movable between a first position, wherein said key engages in said keyway of said second drive sprocket to lock said second drive sprocket to said shaft for rotation therewith, and a second position wherein said key engages in said keyway of said first drive sprocket to lock said first drive sprocket to said shaft for rotation therewith, and through an intermediate position, wherein said key engages in said keyways of both said drive sprockets to lock said drive sprockets to said shaft in said second relative angular position with respect to one another for rotation of said drive sprockets in unison with said shaft, means operatively connecting said clutch yoke and clutch key for movement thereof in unison between said positions thereof, and said steering mode selector being operatively connected to said clutch yoke and clutch key for moving said yoke and key to said positions thereof.

9. A camera dolly comprising a supporting base including a pair of front caster wheels and a pair of rear caster wheels, each said wheel having a generally vertical swivel axis and a generally horizontal rotation axis and being rotatable on its swivel axis to a neutral position wherein the rotation axis of the respective wheel is approximately normal to the longitudinal center line of the dolly, an upright steering handle rotatably supported on the rear end of said base, transmission means mounted on the underside of said base directly below said handle and operatively connected between said wheels and said handle, said transmission means comprising a rotary shaft coaxial with and operatively connected to said handle for rotation of said shaft by said handle, first and second drive sprockets rotatable on said shaft, a first driven sprocket rigid on each rear wheel concentric with its swivel axis, a second driven sprocket rigid on each front wheel concentric with its swivel axis, a first endless force transmission member trained about said first sprockets whereby rotation of said first drive sprocket is effective to rotate said rear wheels in unison on their respective swivel axes, a second endless force transmission member trained about said second sprockets, whereby rotation of said second drive sprocket is effective to rotate said front wheels in unison on their respective swivel axes, said rotation axes of said rear wheels being approximately parallel and said rotation axes of said front wheels being approximately parallel, said drive sprockets being disposed in first given angular positions relative to said base and second given angular positions relative to one another when said wheels occupy said neutral positions, a clutch yoke mounted on the under side of said base adjacent said shaft for movement along a direction line parallel to said shaft, said yoke including arms straddling said drive sprockets and slidable on said shaft, said clutch yoke being movable between first and second positions and through an intermediate position, first co-acting clutch means on said first drive sprocket and the adjacent yoke arm which engage to lock said first drive sprocket to said base in said first relative angular position with respect to said base when said yoke occupies said first position, second co-acting clutch means on said second drive sprocket and the adjacent yoke arm which engage to lock said second drive sprocket to said base in said first relative angular position with respect to said base when said yoke occupies said second position, said first and second clutch means being disengaged when said yoke occupies said intermediate position, said shaft having a slot extending axially through and opening radially toward said drive sprockets and said drive sprockets having internal keyways alignable with said slot, a clutch key slidably positioned in said slot and extending radially beyond said shaft for engaging in said sprocket keyways, said clutch key being movable between a first position wherein said key engages in said keyway of said second drive sprocket to lock said second drive sprocket to said shaft for rotation therewith, and a second position, wherein said key engages in said keyway of said first drive sprocket to lock said first drive sprockets to said shaft for rotation therewith, and through an intermediate position, wherein said key engages in said keyways of both drive sprockets to lock both drive sprockets to said shaft in said second relative angular position with respect to one another for rotation of said drive sprockets in unison with said shaft, means operatively connecting said yoke and clutch key for movement thereof in unison to said positions thereof, and means including a steering mode selector on said steering handle for moving said clutch yoke and clutch key in unison between said positions thereof.

10. A camera dolly according to claim 9 wherein: said last mentioned means comprises a spring for urging said clutch yoke and clutch key to one of said first and second positions, and said steering mode selector includes a rod extending through said handle into operative engagement with said yoke and key for moving said yoke and key in unison to said intermediate positions and the other of said first and second positions against the action of said spring.

11. A camera dolly according to claim 9 wherein: said last mentioned means comprises a spring for urging said clutch yoke and clutch key to one of said first and second positions, said steering mode selector includes a rod extending through said handle into operative engagement with said yoke and key for moving said yoke and key in unison to said intermediate positions and the other of said first and second positions against the action of said spring, and pin and slot means co-acting between said steering mode selector and said handle for releasably locking said yoke and key in said positions, respectively.

12. A camera dolly according to claim 9 including: means releasably operatively connecting said handle to said shaft and said steering mode selector to said clutch yoke and clutch key thereby to permit removal of said handle and said steering mode selector from said base.

13. A camera dolly according to claim 9 including: a frame supporting said handle, means releasably securing said frame to the upper side of said base, and means releasably operatively connecting said handle to said shaft and said steering mode selector to said clutch yoke and clutch key, whereby said frame, handle, and steering mode selector are removable as a unit from said base.

14. A camera dolly comprising: a supporting base including a pair of front caster wheels and a pair of rear caster wheels, each said wheel having a generally vertical swivel axis and a generally horizontal rotation axis and being rotatable on its swivel axis to a neutral position wherein the rotation axis of the respective wheel is approximately normal to the longitudinal center line of the dolly, an upright removable steering handle rotatably supported on the rear end of said base, transmission means mounted on the underside of said base directly below said handle including a rotary shaft coaxial with said handle, and means operatively connected between said wheels and shaft for selectively locking either wheel pair in their neutral positions while drivably coupling the other wheel pair to said shaft for rotation of said other wheel pair by said shaft in unison on the respective swivel axes in such manner that the rotation axes of said other wheel pair remain approximately parallel, and coupling both said wheel pairs to said shaft for rotation of both wheel pairs by said shaft in unison on their respective swivel axes in such manner that the rotation axes of both wheel pairs remain approximately parallel, means releasably coupling said handle to said shaft for rotation of said shaft by said handle, and a steering mode selector on said handle operatively and releasably connected to said transmission means for shifting said transmission means to effect said effective locking of said wheels to said base and drivably coupling of said wheels to said shaft, and said handle and said steering mode selector being removable as a unit from said base.

15. A camera dolly according to claim 14 including: a frame supporting said handle, and means releasably securing said frame to said base for removal of said frame, handle, and steering mode selector as a unit from said base.

References Cited by the Examiner

UNITED STATES PATENTS

| | | | |
|---|---|---|---|
| 1,289,296 | 12/1918 | Stebbins et al. | 280—91 |
| 1,901,276 | 3/1933 | Adams. | |
| 2,842,376 | 7/1958 | Krilanovich | 280—91 |
| 2,995,380 | 8/1961 | King | 280—91 |
| 3,244,250 | 4/1966 | Barrett | 180—79.1 |

KENNETH H. BETTS, *Primary Examiner.*